United States Patent
Hu et al.

(10) Patent No.: US 10,623,293 B2
(45) Date of Patent: Apr. 14, 2020

(54) SYSTEMS AND METHODS FOR DYNAMIC OPERATIONS, ADMINISTRATION, AND MANAGEMENT

(71) Applicants: Jie Hu, San Clemente, CA (US); Marc Holness, Nepean (CA); Cory Gordon, Colbert, WA (US); Mradula Neginhal, San Jose, CA (US); Madhavi R. Joshi, San Jose, CA (US); Asheesh Jadav, Milpitas, CA (US)

(72) Inventors: Jie Hu, San Clemente, CA (US); Marc Holness, Nepean (CA); Cory Gordon, Colbert, WA (US); Mradula Neginhal, San Jose, CA (US); Madhavi R. Joshi, San Jose, CA (US); Asheesh Jadav, Milpitas, CA (US)

(73) Assignee: Ciena Corporation, Hanover, MD (US)

( * ) Notice: Subject to any disclaimer, the term of this patent is extended or adjusted under 35 U.S.C. 154(b) by 243 days.

(21) Appl. No.: 14/989,884

(22) Filed: Jan. 7, 2016

(65) Prior Publication Data
US 2016/0156540 A1 Jun. 2, 2016

Related U.S. Application Data

(63) Continuation of application No. 13/290,947, filed on Nov. 7, 2011, now Pat. No. 9,264,328.

(51) Int. Cl.
*H04L 12/26* (2006.01)
*H04L 12/24* (2006.01)

(52) U.S. Cl.
CPC ........ *H04L 43/103* (2013.01); *H04L 41/0816* (2013.01); *H04L 41/0886* (2013.01);
(Continued)

(58) Field of Classification Search
CPC ... H04L 43/103; H04L 43/16; H04L 41/0816; H04L 43/04; H04L 43/0811; H04L 41/0886; H04L 41/06
See application file for complete search history.

(56) References Cited

U.S. PATENT DOCUMENTS 8,175,008 B1 * 5/2012 Rustagi ............... H04L 41/0806
370/254
8,184,526 B2   5/2012 Duncan et al.
(Continued)

FOREIGN PATENT DOCUMENTS

WO   WO 2010/086750 A1   8/2010

OTHER PUBLICATIONS

IEEE Standard for Local and metropolitan area networks—Virtual Bridged Local Area Networks; Amendment 5: Connectivity Fault Management; Sponsored by the LAN/MAN Standards Committee; IEEE Std 802.1agTM-2007; Dec. 17, 2007.
(Continued)

*Primary Examiner* — Walter J Divito
*Assistant Examiner* — Anthony Luo
(74) *Attorney, Agent, or Firm* — Clements Bernard Walker PLLC; Christopher L. Bernard; Lawrence A. Baratta, Jr.

(57) ABSTRACT

Systems and methods with dynamic Connectivity Fault Management (CFM) and Continuity Check Messages (CCMs) that enable dynamic configurations to avoid limitations associated with static reconfigurations. Variously, a network, a method, and a network element are configured to implement a dynamic CFM method for dynamic notifications and actions taken based thereon between Maintenance End Points (MEPs). The systems and methods may also include a CCM attribute adjustment method between two MEPs, a CCM suspension and/or resumption method
(Continued)

between two MEPs, and a MEP auto-discovery and leaving method. Advantageously, the systems and methods may be utilized in a variety of contexts including controlled maintenance, in-service software upgrades, network congestion, discovery of new remote MEPs, and the like to enable dynamic configurations between MEPs. The systems and methods may also apply to Carrier Ethernet, Multiprotocol Label Switching-Transport Profile (MPLS-TP), and the like.

18 Claims, 8 Drawing Sheets

(52) U.S. Cl.
CPC .......... *H04L 43/04* (2013.01); *H04L 43/0811* (2013.01); *H04L 43/16* (2013.01); *H04L 41/06* (2013.01)

(56) References Cited

U.S. PATENT DOCUMENTS

| | | | |
|---|---|---|---|
| 8,229,705 | B1 | 7/2012 | Mizrahi et al. |
| 8,458,322 | B2* | 6/2013 | Salam ................ H04L 41/0213 709/223 |
| 2006/0159008 | A1 | 7/2006 | Sridhar et al. |
| 2006/0215548 | A1 | 9/2006 | Le Feaucheur et al. |
| 2008/0049748 | A1* | 2/2008 | Bugenhagen .......... H04L 12/14 370/389 |
| 2009/0003337 | A1* | 1/2009 | Daines ................ H04L 43/0811 370/389 |
| 2009/0109837 | A1 | 4/2009 | Kini et al. |
| 2009/0234969 | A1 | 9/2009 | Mohan et al. |
| 2010/0061252 | A1* | 3/2010 | Kini .................... H04L 12/4641 370/248 |
| 2010/0085878 | A1* | 4/2010 | McDade ............ H04L 41/0631 370/242 |
| 2010/0157788 | A1 | 6/2010 | Ellis et al. |
| 2010/0238791 | A1 | 9/2010 | Duncan et al. |
| 2010/0238808 | A1 | 9/2010 | Salam et al. |
| 2010/0246406 | A1 | 9/2010 | Hill et al. |
| 2011/0022698 | A1 | 1/2011 | Salam |
| 2012/0030319 | A1* | 2/2012 | Andries .............. H04L 41/5009 709/220 |
| 2012/0114108 | A1 | 5/2012 | Katis et al. |

OTHER PUBLICATIONS

Juniper Networks (White Paper); MPLS Transport Profile (MPLS-TP)—A Set of Enhancements to the Rich MPLS Toolkit; Copyright 2011, Juniper Networks, Inc.

MEF (C) The Metro Ethernet Forum; Technical Specification MEF17; Service OAM Requirements & Framework—Phase 1—Apr. 2007.

Steven Chen, Deputy General Manager, Product Management & Marketing of Broadband Business Unit; Utstarcom—MPLS-TP OAM in Packet Transport Network (PTN)—Broadband Business Unit (BBU) Nov. 2010.

Dave Ward, Malcom Betts, ed.; MPLS Architectural Considerations for a Transport Profile; ITU-T—IETF Joint Working Team; Apr. 18, 2008.

International Telecomminication Union—Telecommunication Standardization Sector—Study Period 2009-2012; Study Group 15—TD 478 (PLEN/15); Title; Draft Recommendation ITU-T G.8113.2/Y. 1372.2; Dec. 5-16, 2011.

International Telecomminication Union—Telecommunication Standardization Sector—Study Period 2009-2012; Study Group 15—Report 22—COM 15-R22-E; Title: "Determined Recommendation ITU-T G.8113.1 Operations, Administration and Maintenance mechanism for MPLS-TP in Packet Transport Network (PTN)"—May 2011.

International Telecomminication Union (ITU-T)—Telecommunication Standardization Sector; G.8013/Y.1731—OAM Functions and Mechanisms for Ethernet Based Networks. Jul. 2011.

Cisco—Understanding MPLS-TS and Its Benefits—Overview of Multiprotocol Label Switching; Cisco Systems, Inc. (c) 2009 White Paper.

\* cited by examiner

SYSTEMS AND METHODS FOR DYNAMIC OPERATIONS, ADMINISTRATION, AND MANAGEMENT

CROSS-REFERENCE TO RELATED APPLICATION(S)

The present patent/application is a continuation of U.S. patent application Ser. No. 13/290,947, filed Nov. 7, 2011, and entitled "SYSTEMS AND METHODS FOR DYNAMIC OPERATIONS, ADMINISTRATION, AND MANAGEMENT," the contents of which are incorporated by reference.

FIELD OF THE INVENTION

The present disclosure relates generally to networking systems and methods. More particularly, improved systems and methods that enable dynamic configurations to avoid the limitations associated with static reconfigurations are disclosed herein.

BACKGROUND OF THE INVENTION

Carrier Ethernet is evolving to support the needs of the carrier network environment. Carrier Ethernet requires scalable, reliable, and dynamic mechanisms to support operations, administration, and management (OAM) and traffic engineering (TE). Standards have been developed in the Metro Ethernet Forum (MEF), International Telecommunication Union (ITU), Institute of Electrical and Electronics Engineers (IEEE), and the like providing many of these required extensions. Specifically, Connectivity Fault Management (CFM) is an Ethernet standard to provide many common OAM functions associated with underlying network transport for services. For example, CFM is defined in IEEE 802.1ag-2007 IEEE Standard for Local and Metropolitan Area Networks Virtual Bridged Local Area Networks Amendment 5: Connectivity Fault Management, the contents of which are herein incorporated by reference. Also, OAM functions are also defined in ITU-T G.8013/Y.1731 (07/2011) "OAM functions and mechanisms for Ethernet based networks," the contents of which are herein incorporated by reference. Further, the MEF also defines Ethernet OAM in various technical specifications, such as MEF 17 (04/2007) "Service OAM Requirements & Framework," the contents of which are herein incorporated by reference. Variously, CFM enables definition of maintenance domains, their constituent maintenance points, and the managed objects required to create and administer them; definition of relationships between maintenance domains and the services offered by Virtual Local Area Network (VLAN)-aware bridges and provider bridges; description of protocols and procedures used by maintenance points to maintain and diagnose connectivity faults within a maintenance domain; and the like.

CFM includes Continuity Check Messages (CCM) which may generally be referred to as "heartbeat" messages for CFM. That is, CCMs provide a mechanism to detect connectivity failures in a Maintenance Entity Group (MEG) or a Maintenance Association (MA). CCMs are multicast messages that are confined to a MEG Level or a Maintenance Domain (MD). These messages are unidirectional and do not solicit a response. Each Maintenance End Point (MEP) transmits a periodic multicast CCM inward towards the other MEPs. Conventionally, CCM related attributes are statically configured in IEEE 802.1ag-2007, G.8013/Y.1731, and the MEF. In order to change the attributes, static reconfiguration is required. Also, MEPs are statically configured in IEEE 802.1ag-2007, G.8013/Y.1731, MEF 17, etc. In order to add or remove a MEP from a MEG or a MA, static reconfiguration is also needed.

The disclosure herein addresses problems caused by the requirement for such static reconfiguration. For example, such static reconfiguration required by the prior art systems adds complexity, especially with the large scale of proactive service OAM sessions. Further, either from complexity, or time allowed (for uncontrolled cases), it is difficult to protect service traffic during such static reconfiguration.

BRIEF SUMMARY OF THE INVENTION

Accordingly, improved systems and methods that enable dynamic configurations to avoid the limitations associated with static reconfigurations are disclosed herein.

In an exemplary embodiment, a method implemented by a network element for performing dynamic Operations, Administration, and Maintenance (OAM) includes communicating Connectivity Fault Management (CFM) frames with a second network element, wherein the communicating is based on a set of attributes; modifying one or more attributes of the set of attributes based on data in a CFM frame from the second network element; and communicating the CFM frames with the second network element based on the set of attributes and the adjusted one or more attributes subsequent to the modifying. The one or more attributes can include a transmission interval of Continuity Check Messages (CCMs) and the modifying can include changing from a first value to a second value. The one or more attributes can include a threshold count associated with Continuity Check Messages (CCMs) for determining a defect condition and the modifying can include changing from a first value to a second value. The one or more attributes can include a one of suspension and resumption of transmission of Continuity Check Messages (CCMs) and the modifying can include changing between the suspension and the resumption. The suspension can be for a specific time period, based on one of maintenance and congestion. The one or more attributes can include configuration of a Maintenance Entity Group and the modifying can include adjusting which network elements are in the Maintenance Entity Group. The one or more attributes can be modified without traffic loss or loss of OAM between the network element and the second network element. The modifying can be performed based one of network congestion, a maintenance event, and a service change to avoid loss of OAM between the network element and the second network element based thereon. The data in the CFM frame can be communicated via one of a vendor specific Operational Code (OpCode) Protocol Data Unit (PDU) and an organization specific Type, length, and value (TLV).

In another exemplary embodiment, a network element configured to perform dynamic Operations, Administration, and Maintenance (OAM) a port configured to communicate Connectivity Fault Management (CFM) frames with a second network element, wherein the communication is based on a set of attributes; and a controller configured to modify one or more attributes of the set of attributes based on data in a CFM frame from the second network element, wherein the port is configured to the CFM frames with the second network element based on the set of attributes and the adjusted one or more attributes subsequent to the modification. The one or more attributes can include a transmission interval of Continuity Check Messages (CCMs) and the modifying can include changing from a first value to a second value. The one or more attributes can include a threshold count associated with Continuity Check Messages (CCMs) for determining a defect condition and the modifying can include changing from a first value to a second value. The one or more attributes can include a one of suspension and resumption of transmission of Continuity Check Messages (CCMs) and the modifying can include changing between the suspension and the resumption. The suspension can be for a specific time period, based on one of maintenance and congestion. The one or more attributes can include configuration of a Maintenance Entity Group and the modifying can include adjusting which network elements are in the Maintenance Entity Group. The one or more attributes can be modified without traffic loss or loss of OAM between the network element and the second network element. The modifying can be performed based one of network congestion, a maintenance event, and a service change to avoid loss of OAM between the network element and the second network element based thereon. The data in the CFM frame can be communicated via one of a vendor specific Operational Code (OpCode) Protocol Data Unit (PDU) and an organization specific Type, length, and value (TLV).

In a further exemplary embodiment, a Maintenance Entity Group includes a first network element configured as a first Maintenance End Point (MEP); and a second network element configured as a second MEP communicatively coupled to the first MEP; wherein Connectivity Fault Management (CFM) frames are communicated between the first MEP and the second MEP based on a set of attributes, wherein the first MEP is configured to modify one or more attributes of the set of attributes based on data in a CFM frame from the second MEP, and the CFM frames are communicated based on the set of attributes and the adjusted one or more attributes subsequent to the modification. The one or more attributes can include at least one of a transmission interval of Continuity Check Messages (CCMs), and the modification includes changing from a first value to a second value, threshold count associated with Continuity Check Messages (CCMs) for determining a defect condition and the modification includes changing from a first value to a second value, a one of suspension and resumption of transmission of Continuity Check Messages (CCMs) and the modification includes changing between the suspension and the resumption, and configuration of a Maintenance Entity Group and the modification includes adjusting which network elements are in the Maintenance Entity Group.

In an exemplary embodiment, a dynamic Ethernet Connectivity Fault Management (CFM) method includes a first Maintenance End Point (MEP) transmitting an Ethernet notification to at least one remote MEP; the at least one remote MEP receiving the Ethernet notification; and the at least one remote MEP dynamically performing an action while in service based on the Ethernet notification, the action including dynamically modifying at least one CFM attribute of the at least one remote MEP. The dynamic Ethernet CFM method may further include transmitting the Ethernet notification through one of an asynchronous manner, a synchronous manner, and an uncontrolled manner, the asynchronous manner including transmission to the at least one remote MEP without an acknowledgement, the synchronous manner including a handshake between the first MEP and the at least one remote MEP, and the uncontrolled manner including transmission of N consecutive Ethernet notifications to the at least one remote MEP. The dynamic Ethernet CFM method may further include exchanging Continuity Check Messages between the first MEP and the at least one MEP based on attributes associated with the Ethernet notification.

The dynamic Ethernet CFM method may further include the first MEP transmitting the Ethernet notification to at least one remote MEP based on one of network congestion, a maintenance event, and a service change; and the at least one remote MEP dynamically performing the action with the action based on the one of network congestion, a maintenance event, and a service change. The dynamic Ethernet CFM method may further include, based on network congestion, performing the action includes the at least one remote MEP dynamically adjusting at least one of transmission intervals and defect thresholds associated with Continuity Check Messages. The dynamic Ethernet CFM method may further include, based on the maintenance event, performing the action includes the at least one remote MEP performing one of dynamically adjusting at least one of transmission intervals and defect thresholds associated with Continuity Check Messages; and dynamically suspending Continuity Check Messages. The dynamic Ethernet CFM method may further include, based on the service change, the service change including adjustment of a criticality of a service, performing the action includes the at least one remote MEP dynamically adjusting at least one of transmission intervals and defect thresholds associated with Continuity Check Messages responsive to the service change.

The Ethernet notification may include an Ethernet Maintenance Communication Channel function Protocol Data Unit with data related to the Ethernet notification and the action contained in a Type, Length, Value therein. Alternatively, the Ethernet notification may include a Protocol Data Unit with one of a vendor-specific, reserved, and undefined OpCode and with data related to the Ethernet notification and the action contained in a Type, Length, Value therein. The dynamically modifying at least one CFM attribute may include any of dynamically reconfiguring attributes associated with Continuity Check Messages exchanged between the first MEP and the at least one remote MEP, one of suspending and resuming Continuity Check Messages exchanged between the first MEP and the at least one remote MEP, and notifying of the first MEP leaving a Maintenance Entity Group including the first MEP and the at least one remote MEP.

The dynamic Ethernet CFM method may further include the at least one remote MEP dynamically performing an action in a system database disposed therein. The dynamic Ethernet CFM method may further include, upon receiving the Ethernet notification at the at least one remote MEP; checking if the first MEP is included in the system database; if the first MEP is not in the system database, dynamically adding the first MEP to configuration data in the system database; and if the first MEP is in the system database, adjusting the first MEP in the configuration data in the system database such that the first MEP is active on a port receiving the Ethernet notification. The Ethernet notification may include a notice the first MEP is leaving one of a Maintenance Entity Group (MEG) and Maintenance Association (MA); and the method may further include updating the system database based on the Ethernet notification.

In another exemplary embodiment, an Ethernet network includes a first Maintenance End Point (MEP); and a second MEP communicatively coupled to the first Maintenance End Point; wherein the first MEP and the second MEP are configured to exchange Continuity Check Messages therebetween with a plurality of attributes associated therewith; and wherein the first MEP and the second MEP are configured to dynamically adjust the plurality of attributes utilizing an Ethernet notification exchanged therebetween, the plurality of attributes includes at least one of transmission interval of the Continuity Check Messages, threshold count associated with the Continuity Check Messages for defect conditions, and one of suspension and resumption of transmission of the Continuity Check Messages. The plurality of attributes may be dynamically adjusted based on at least one of network congestion, a maintenance event, and a service change related to the criticality of a service. Based on network congestion, the first MEP and the second MEP may dynamically adjust at least one of transmission intervals and defect thresholds associated with Continuity Check Messages; based on the maintenance event, the first MEP and the second MEP may perform one of dynamically adjusting at least one of transmission intervals and defect thresholds associated with Continuity Check Messages; and dynamically suspending Continuity Check Messages; and based on the service change, the first MEP and the second MEP may dynamically adjust at least one of transmission intervals and defect thresholds associated with Continuity Check Messages responsive to the service change.

In yet another exemplary embodiment, a network element configured to dynamically adjust Ethernet Operations, Administration, and Maintenance (OAM) frame attributes include at least one Ethernet port; a switching fabric communicatively coupled to the at least one Ethernet port and configured to provide switching therebetween; and a controller communicatively coupled to the at least one Ethernet port and the switching fabric, the controller configured to exchange OAM frames with a second network element; receive an Ethernet notification from the second network element to dynamically modify attributes associated with the Ethernet OAM frames; dynamically modify the attributes based on the Ethernet notification; and exchange Ethernet OAM frames with the dynamically modified attributes between the second network element. The controller may include a system database, and the controller may be further configured to, upon receiving the OAM frames, check if the second network element is in the system database; if the second network element is not in the system database, dynamically add the second network element to configuration data in the system database; and if the second network element is in the system database, adjust configuration data in the system database such that the second network element is active on a port receiving the OAM frames.

In still yet another exemplary embodiment, a Continuity Check Message adjustment method includes exchanging Continuity Check Messages between a first Maintenance End Point (MEP) and a second MEP with a first set of attributes associated with the Continuity Check Messages; determining an adjustment is required to the first set of attributes; the first MEP notifying the second MEP of the adjustment; the second MEP performing an action to establish a second set of attributes for the Continuity Check Messages based on Ethernet notification of the adjustment; and exchanging Continuity Check Messages between the first MEP and a second MEP with the second set of attributes associated with the Continuity Check Messages. Attributes associated with the first set of attributes and the second set of attributes may include at least one of transmission intervals of the Continuity Check Messages, defect thresholds associated with the Continuity Check Messages, suspension of the Continuity Check Messages, and resumption of the Continuity Check Messages.

In still yet another exemplary embodiment, a network method a first network element communicating with a second network element; the first network element requiring a modification to at least one Operations, Administration, and Maintenance (OAM) attribute between the first network element and the second network element; the first network element transmitting a notification related to the modification of the second network element; the second network element receiving the notification; and the second network element dynamically performing an action while in service based on the notification, the action can include dynamically modifying said at least one OAM attribute. The at least one OAM attribute may include a Performance Management (PM) or Fault Management (FM) attribute. The at least one OAM attribute may also include a Connectivity Fault Management (CFM) attribute. The first network element and the second network element communicate therebetween utilizing Multiprotocol Label Switching-Transport Profile (MPLS-TP), and the attribute relates to MPLS-TP FM and/or MPLS-TP PM.

BRIEF DESCRIPTION OF THE DRAWINGS

Exemplary and non-limiting embodiments of the present disclosure are illustrated and described herein with reference to the various drawings, in which like reference numbers denote like method steps and/or system components, respectively, and in which:

FIG. 2 is a block diagram of an exemplary implementation of a network element such as for a Maintenance End Point (MEP), a Maintenance Intermediate Point (MIP), and the like;

DETAILED DESCRIPTION OF THE INVENTION

The Ethernet Connectivity Fault Management (CFM) architecture, as currently being standardized, provides an impressive framework for addressing end-to-end Ethernet Connectivity and Fault Management at any level of a hierarchy. In various exemplary embodiments, the present invention relates to Carrier Ethernet systems and methods with dynamic CFM and Continuity Check Messages (CCMs) that enable dynamic configurations to avoid the aforementioned limitations associated with static reconfigurations. The Carrier Ethernet systems and methods may include a network, a method, and/or a network element configured to implement a dynamic CFM method for dynamic notifications and actions taken based thereon between MEPs. The Carrier Ethernet systems and methods may also include a CCM attribute adjustment method between two MEPs, a CCM suspension and/or resumption method between two MEPs, and a MEP auto-discovery and/or leaving method. Advantageously, the Carrier Ethernet systems and methods may be utilized in a variety of contexts including controlled maintenance, in-service software upgrades, network congestion, the discovery of new remote MEPs, and the like to enable dynamic configurations between MEPs.

Figure 1:
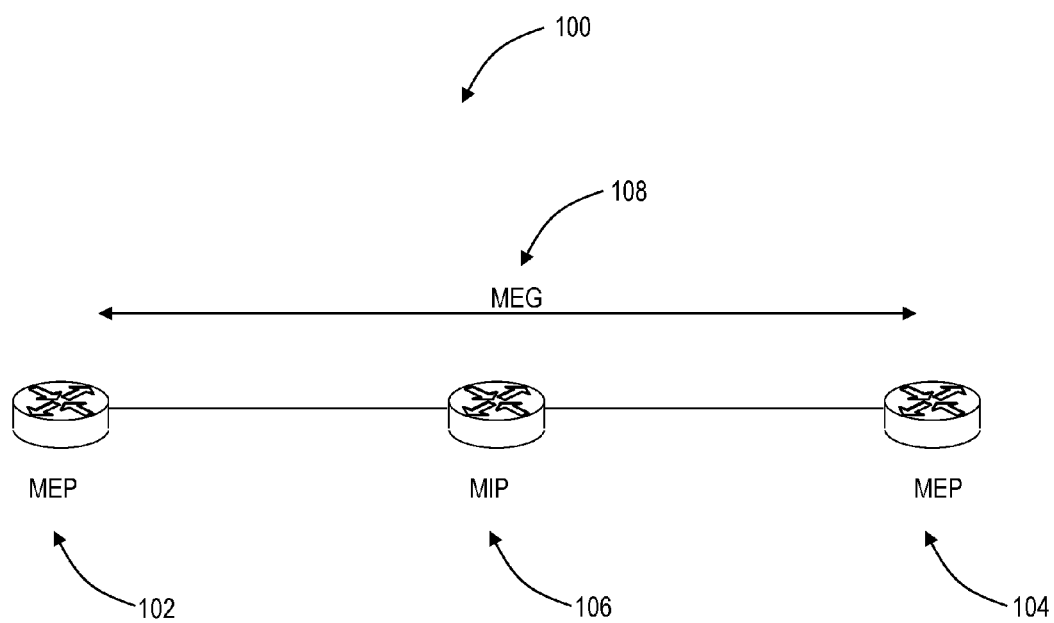
FIG. 1 is a network diagram of an Ethernet network configured with dynamic Ethernet OAM mechanisms.

Referring to FIG. 1, in an exemplary embodiment, a network diagram illustrates an Ethernet network 100 configured with Ethernet OAM mechanisms. For illustration purposes, the Ethernet network 100 includes three interconnected network elements 102, 104, 106. The IEEE 802.1ag Connectivity Fault Management (CFM) standard provides many of the common OAM functions associated with the underlying network transport for services. Fundamental to CFM is the concept of a Maintenance Entity Group (MEG) or a Maintenance Association (MA), which is the identified network transport construct spanning the various network nodes underlying a given service or set of services. CFM relies on well-defined messages exchanged between the network elements, specifically and, in particular, each End Point (MEP) that provides origination and termination of the service transport path(s) for a MEG. The network elements 102, 104 are defined as a MEG End Point (MEP). In CFM, a MEP is configured to source and sink CFM frames, i.e. source and sink within a single configured MD (Maintenance Domain), pass-thru if MD Level is higher than the configured level for the MEP, and discard if MD Level is lower. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 106 is defined as a MIP, which resides between MEPs, i.e. the MIP 106 is communicatively coupled between the MEPs 102, 104. A MIP is configured to process and forward CFM frames but does not initiate CFM frames. Although a MIP does not initiate protocol transactions, it does transmit Loopback Reply (LBR) and Linktrace Reply (LTR) messages in response to received Loopback Message (LBM) and Linktrace Message (LTM) messages respectively. As described herein, MEP and MIP terminology is used for nodes present at endpoints and intermediate points, respectively, in the Ethernet network 100. Also, Ethernet Path terminology is used to denote a point-to-point Ethernet connection between two nodes, e.g. the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the Carrier Ethernet systems and methods described herein.

The Carrier Ethernet systems and methods contemplate implementation and operation on Carrier Ethernet networks such as those compliant to IEEE 802.1ag-2007, G.8013/Y.1731, and/or MEF. Of note, IEEE 802.1ag-2007 and G.8013/Y.1731 both relate to and define CFM for Ethernet OAM. Various terminology utilized herein, such as MEP, MIP, CCM, PDU, etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same construct. Those of ordinary skill in the art will recognize while described herein as the MEG 108, the MEG 108 could also be referred to as the MA 108. Generally, the MEG 108 and MA relate to an administrative grouping relative to the MEPs 102, 104. Additionally, IEEE 802.1ag-2007 defines a MEP as a Maintenance association End Point whereas G.8013/Y.1731 and MEF define a MEP as a Maintenance Entity Group End Point. In the following description, MEP may be generally referred to as a Maintenance End Point covering both the constructs of IEEE 802.1ag-2007, G.8013/Y.1731, MEF.

The network elements 102, 104, 106 are configured in a MEG 108 which enable a grouping of nodes in a maintenance group for OAM to be grouped on different spans. The MEG 108 (or an MA 108) is a set of MEPs, each configured with a same unique MEG ID code (UMC) and MEG Level or Maintenance Association Identifier (MAID) and Maintenance Domain (MD) level. The MEG 108 may be thought of as a full mesh a Maintenance Entities (MEs), the MEs including MEPs, MIPs, etc., with a set of MEPs configured therebetween. The UMC is a unique identifier for the MEG 108 domain. Additionally, the MEG 108 allows for nesting of various groups. The MEG Level and the MD is a management space on a network, typically owned and operated by a single entity. MEG Levels and MDs may be configured with names and levels, where the eight levels range from 0 to 7. A hierarchal relationship exists between domains based on levels. The larger the domain, the higher the level value. In case MEGs are nested, the OAM flow of each MEG has to be clearly identifiable and separable from the OAM flows of the other MEGs. In cases the OAM flows are not distinguishable by the ETH layer encapsulation itself, the MEG Level in the OAM frame distinguishes between the OAM flows of nested MEGs. Eight MEG Levels are available to accommodate different network deployment scenarios. As described herein, the various Carrier Ethernet systems and methods may be applied to per-node MEPs, per-interface MEPs, or per-port MEPs. Specifically, a per-node MEP applies to an entire network element whereas per-interface and per-port MEPs are for a single provisioned service on the network element.

In an exemplary embodiment, the network 100 may utilize Continuity Check Messages (CCMs) for end-to-end path protection (EEPP) fault detection. CCMs are polling-based, asynchronous, and bidirectional by way of two independent unidirectional keepalives. Each MEP 102, 104 sends a CCM frame periodically to its peer MEP 102, 104. All MEPs 102, 104 are configured with a periodic interval, and this is also signaled in the CCM frame for verification. Each MEP 102, 104 expects to receive a CCM frame by the end of that periodic interval. Non-receipt of a certain number of consecutive frames results in a fault. This fault is indicated in Remote Defect Indication (RDI) bit of a CCM frame sent to a peer. This is useful for one-way fault conditions. The MEP 102, 104 exits a fault state only after receiving a certain number of consecutive CCM frames, each at the specified interval. Additionally, the CCM can detect misconnections by comparing MA and MEP identifiers (ID) from the frame with configured values. CCMs may be used per VLAN per MEG/MA level. Each CCM is sent at the highest priority and is ineligible for discard. For scaling purposes of CCM processing, some level of hardware support is typically utilized. Note, MIPs 106 conventionally do not terminate CCM frames, but rather simply forward them along based on frame forwarding criteria in the path (i.e., VLAN swap for VLAN cross-connects, destination MAC plus VLAN based forwarding for bridge path, etc.).

In various exemplary embodiments, the Carrier Ethernet systems and methods provide mechanisms for dynamic CFM and CCMs between the MEPs 102, 104. For example, the Ethernet systems and methods enable dynamic adjustment of CCM such as through a vendor specific Operational Code (OpCode) Protocol Data Unit (PDU), or organization specific Type, length, and value (TLV) in CCM without static reconfiguring. The dynamically adjustable attributes may include, but not limited to, transmission interval, consecutive missing CCMs for connectivity fault declaration, suspension of CCM transmission for specific time period (or indefinite), resumption of CCM transmission (change or resume interval), and the like. Advantageously, such dynamic adjustments may be utilized for controlled maintenance or in-service software upgrade CCM state machine reset/restart. Here, the connectivity fault detections would be on hold for defined time to avoid impacting service. The dynamic adjustments may be utilized for uncontrolled CCM state machine reset/restart (e.g., due to unexpected process reset) while data plane services are maintained, it is possible to use specific mechanisms, such as forwarding engine inject prebuilt notification PDUs, or dying gasp, to notify remote MEPs so that the fault detection could be on hold for longer period. Also, the dynamic adjustments may be used for network congestion conditions such as to hold the connectivity check fault detection for longer time periods when faced with network congestion.

In an exemplary embodiment, the Carrier Ethernet systems and methods described herein are implemented between MEPs that are in a same MEG/MA as one another. That is, the MEPs 102, 104 are in the same MEG 108 (or MA 108). In particular, the Carrier Ethernet systems and methods described herein contemplate operation and adjustments between the MEPs 102, 104 while in the same MEG 108 without requiring static reconfiguration, traffic loss, OAM loss of visibility, etc. Additionally, the Carrier Ethernet systems and methods may include remote MEP auto discovery and mechanisms for MEP leaving notifications such as through a vendor specific OpCode PDU, or an organization-specific TLV in CCM. Advantageously, the remote MEP auto discovery and mechanisms may reduce the MEP configuration complexity.

The remote MEP auto discovery and mechanisms also may provide dynamic notifications related to MEP movements. For example, when one port discovers a new remote MEP while the centralized dynamic configuration has the MEP in another port, a remote MEP may move all the remote MEP attributes and state machine from port to another dynamically. For example, changing of the remote MEP from one port to another port on the same network element may occur for a variety of reasons such as reconfiguration, protection switch, and the like. The remote MEP auto discovery and mechanisms leverages network element wide information in a system database and optionally in local copies of the system database to move/adjust remote MEPs contained therein upon reception of CCMs on certain ports. Additionally, the Ethernet systems and methods enable a more scalable solution by monitoring the more critical services at a higher frequency and less critical services at lower frequency thereby reducing the consumption of resources. When the criticality of a service changes dynamically, the service could automatically be monitored at a higher frequency and vice versa. That is, the Ethernet systems and methods may be implemented based on service change which changes a criticality of the service.

Figure 2:
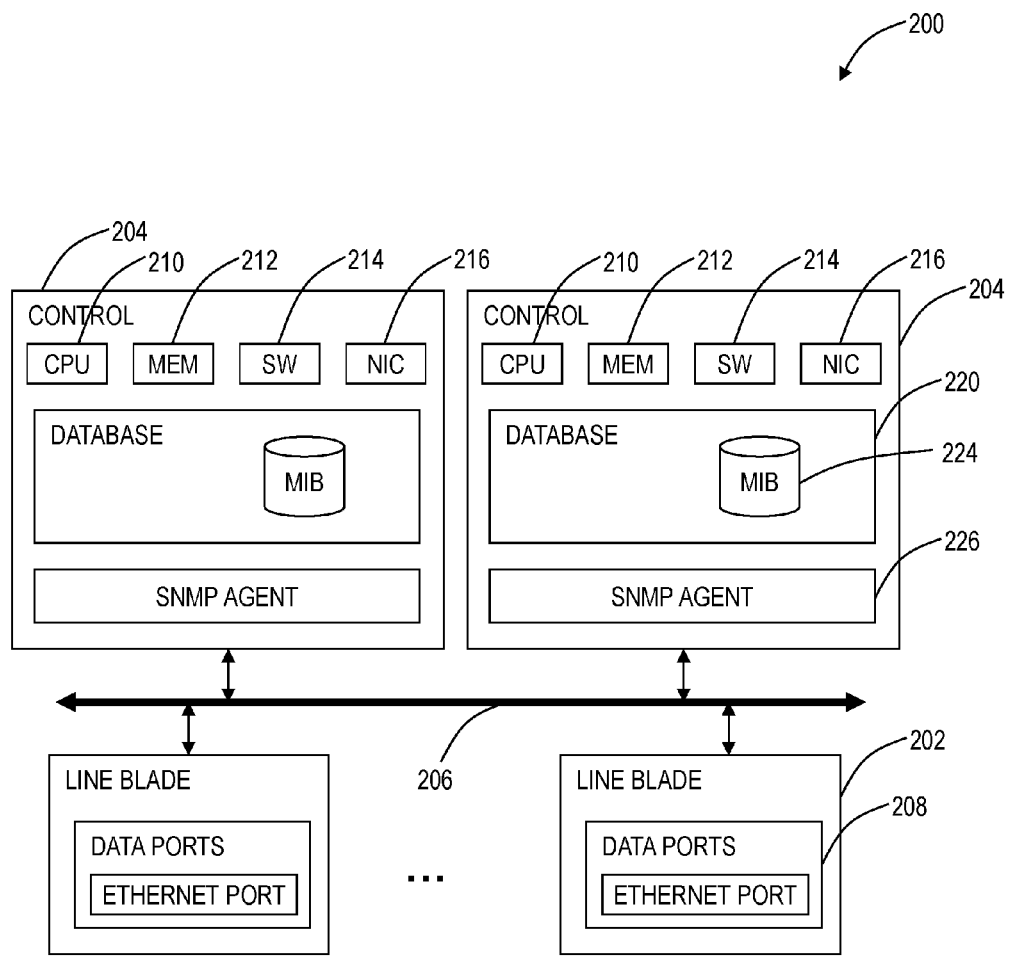

Referring to FIG. 2, in an exemplary embodiment, a block diagram illustrates an exemplary implementation of a network element 200 such as for the MEP 102, 104 and/or the MIP 106 in the network 100. In this exemplary embodiment, the network element 200 is an Ethernet network switch for illustration purposes, but those of ordinary skill in the art will recognize the Carrier Ethernet systems and methods described herein contemplate other types of network elements and other implementations providing dynamic Ethernet OAM systems and methods. In this exemplary embodiment, the network element 200 includes a plurality of blades 202, 204 interconnected via an interface 206. The blades 202, 204 are also known as line cards, line modules, circuit packs, pluggable modules, etc. and refer generally to components mounted within a chassis, shelf, etc. of a data switching device, i.e. the network element 200. Each of the blades 202, 204 may include numerous electronic devices and/or optical devices mounted on a circuit board along with various interconnects including interfaces to the chassis, shelf, etc. Two exemplary blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Exemplary port types may include, but not limited to, GbE, 10 GbE, 40 GbE, 100 GbE, Ethernet over SONET/SDH (2.5G, 10G, 40G, etc.), Ethernet over Optical Transport Network (OTU2, OTU3, OTU4, etc.), and the like. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222 which may include CFM objects. Of note, the Carrier Ethernet systems and methods described herein relate in exemplary embodiments to modification of the CFM objects. Further, the control blades 204 may include a Simple Network Management Protocol (SNMP) Agent 224 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200. Additionally, the control blades 204 may be configured to provide CFM and the Ethernet systems and methods for dynamic configuration thereof.

Figure 3:
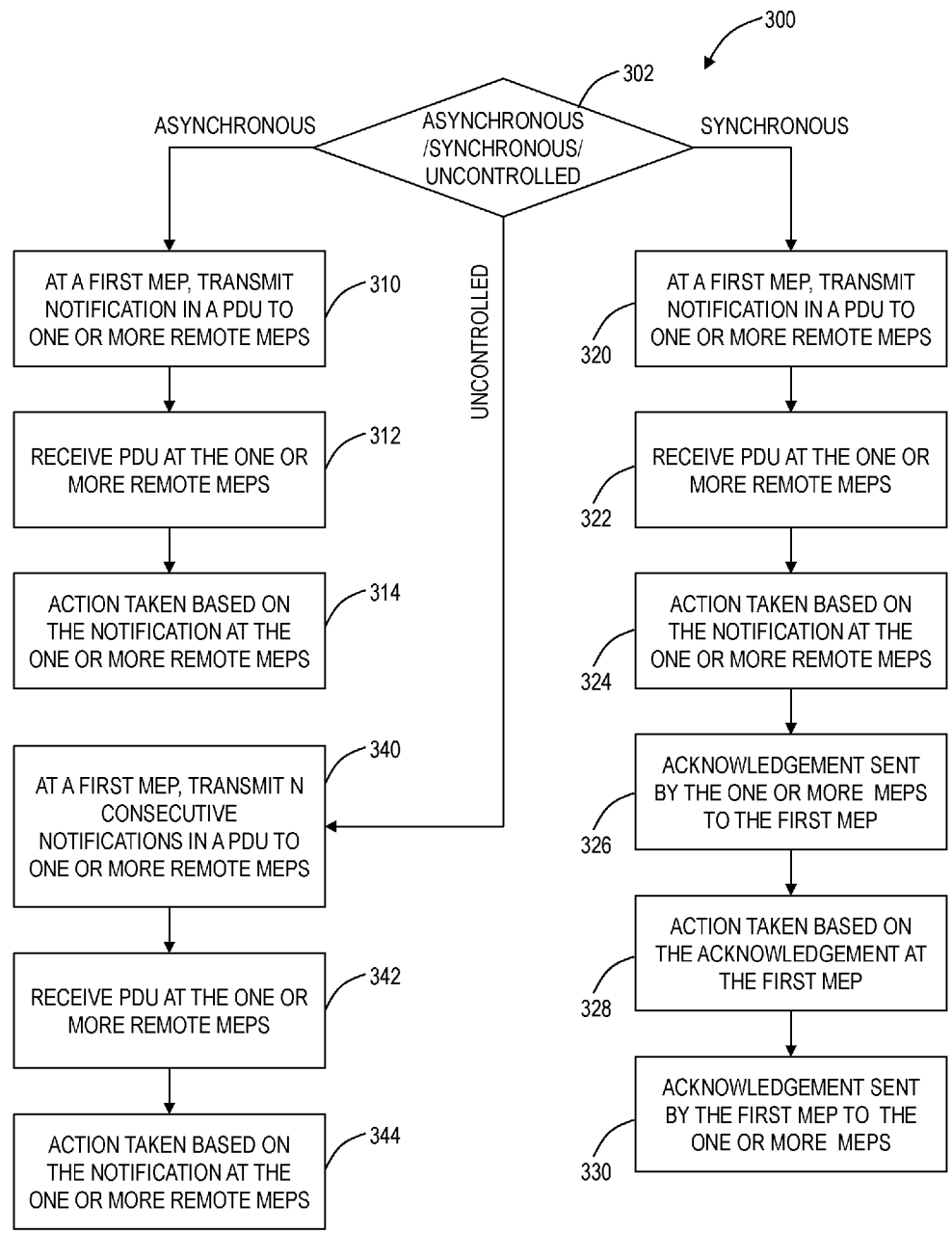
FIG. 3 is a flowchart of a dynamic Connectivity Fault Management (CFM) method for dynamic notifications between MEPs and actions based thereon.

Referring to FIG. 3, in an exemplary embodiment, a flowchart illustrates a dynamic CFM method 300 for dynamic notifications between MEPs and actions based thereon. In an exemplary embodiment, the method 300 provides dynamic notification to remote MEPs of CCM attribute changes, MEP auto discovery, MEP leaving notifications, and the like and associated reconfiguration actions taken therein. The method 300 may be implemented between the MEPs 102, 104 (as well as other MEPs and in other networks). The method 300 includes three communication methods, namely asynchronous, synchronous, and uncontrolled (step 302). Generally, the asynchronous method may be utilized when no response is required, the synchronous method may be utilized in controlled scenarios such as when a three-way handshake is required, and the uncontrolled method may be utilized in catastrophic scenarios. In an exemplary embodiment, the asynchronous, synchronous, and uncontrolled methods may be chosen by the MEPs, by a network operator, based on specific conditions, based on the type of notification, etc.

In an exemplary embodiment, the method 300 may be utilized in the context of Ethernet OAM and CFM with the network 100, the network element 200, and the like. For example, the method 300 may be utilized for dynamically notifying remote MEPs of attribute changes including dynamic configuration of CCM attributes, dynamic configuration of remote MEP discovery, remote MEP move when a new remote discovery has conflicts in a distributed CCM implementation, dynamic configuration of MEP leave (from MA), and the like. With respect to dynamically adjustment of CCM attributes, exemplary attributes may include including transmission interval, fault tolerance, suspension/resumption of transmission/reception (w/o timeout) to allow a local MEP not being detected as faulty by peer MEPs, and the like. For example, such dynamic adjustments of CCMs supports in-service software upgrades when CCM state machines are reset/restart. Further, the dynamic adjustments of CCMs may be applied to dynamically adjust fault tolerance during a network congestion condition changes. With respect to auto discovery and declaration of MEP leave (remove from MEG), the notifications enable dynamic reconfigurations without requiring static reconfiguration and resultant traffic loss. This is especially important in distributed CCM implementations such as within a multi-blade chassis based system and for MEP move from one processor to another. Additionally, the notifications may include dynamically adjusting the CCM interval to allow some services to be monitored at a higher frequency when they are deemed critical and at a lower rate when they are deemed less critical.

For the asynchronous method, at a first MEP, a notification is transmitted in a PDU to one or more remote MEPs (step 310). In the context of the Carrier Ethernet systems and methods described herein, the notification includes instructions and/or notifications for the remote MEP such as described herein for dynamic adjustment of CCMs, MEP auto discovery, declaration of MEP leave, and the like. The PDU with the notification is received at the one or more remote MEPs (step 312). Finally, action is taken based on the notification at the one or more remote MEPs (step 314). Note, the asynchronous method does not require an acknowledgment or confirmation to the first MEP. In an exemplary embodiment, the asynchronous method may be utilized for suspension and/or resumption of CCM transmissions, modifying CCM transmission interval, and the like. For example, the foregoing CCM attribute modifications do not necessarily require acknowledgment from the one or more remote MEPs to the first MEP as the first MEP may clearly determine receipt of the CCM attribute modifications based on the subsequent behavior of the one or more remote MEPs.

For the synchronous method, at a first MEP, a notification is transmitted in a PDU to one or more remote MEPs (step 320). Similar to the asynchronous method, the notification may relate to the dynamic adjustment of CCMs, MEP auto discovery, declaration of MEP leave, and the like. The PDU with the notification is received at the one or more remote MEPs (step 322). The one or more remotes MEPs perform an action based on the notification (step 324). Subsequent to the action, the one or more remotes MEPs send an acknowledgment to the first MEP (step 326). The first MEP performs an action based on the acknowledgment (step 328). Finally, the first MEP may send an acknowledgment to the one or more remote MEPs (step 330). The foregoing steps may be referred to as a three-way handshake between the first MEP and the one or more remote MEPs. In particular, the synchronous method ensures both the first MEP and the one or more remote MEPs receive the notifications and perform any associated actions based thereon. In an exemplary embodiment, the synchronous method may be utilized for controlled scenarios, such as software upgrades (e.g., stop/start CCM transmission, etc.), CCM attribute adjustment, MEP auto discovery, remote MEP leaving an MA, etc.

For the uncontrolled method, at a first MEP, N consecutive notifications are transmitted in a PDU to one or more remote MEPs, N being an integer (step 340). The notifications in the uncontrolled method may include situations based on uncontrolled scenarios (e.g., catastrophe, link/node failure, etc.). In general, the uncontrolled method is utilized by the first MEP to communicate notifications subsequent to an uncontrolled event. Accordingly, the first MEP transmits the N consecutive notifications such that one or more of the N consecutive notifications will be received, if possible. If none of the N consecutive notifications are received, the one or more remote MEPs take no action. If one of the PDUs is received (step 342), the one or more remote MEPs take an action based thereon (step 344).

Figure 4A:
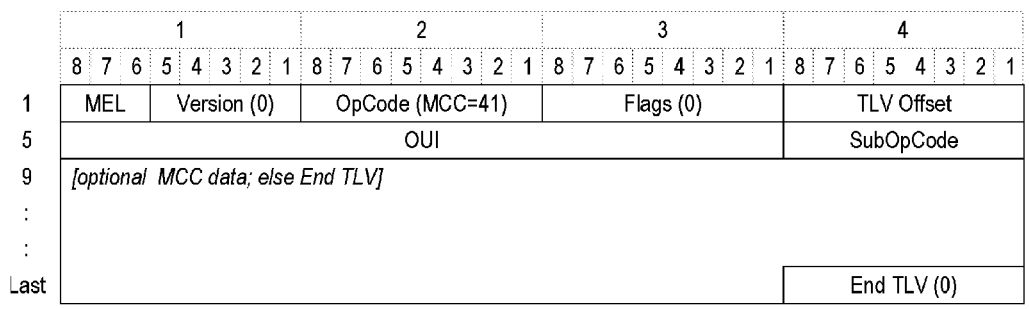
FIGS. 4A and 4B are block diagrams of an exemplary Protocol Data Unit (PDU) for use in the method of FIG. 3.

Referring to FIG. 4A, in an exemplary embodiment, a block diagram illustrates an exemplary PDU 400 for use in the method 300. In an exemplary embodiment, the notifications and information related thereto are provided through G.8013/Y.1731 Ethernet Maintenance Communication Channel function (ETH-MCC) PDUs. The ETH-MCC PDUs are utilized to provide a maintenance communication channel between a pair of MEPs. With respect to the method 300, the ETH-MCC PDU 400 is transmitted from the first MEP to the one or more remote MEPs. At a remote MEP, upon receiving a frame with ETH-MCC information and with a correct MEG Level, the remote MEP passes the ETH-MCC information to a management agent which takes the appropriate action as described herein. MIPs are transparent to the ETH-MCC PDU 400 and, therefore, do not require any configuration information to support ETH-MCC functionality. Of note, the ETH-MCC PDU 400 is considered as an MCC PDU based on an OpCode (set to 41 consisted with G.8013/Y.1731 Table 9.1, OpCode Values). In another exemplary embodiment, the notifications and information related thereto of the method 300 may be implemented through a vendor-specific, reserved, and/or undefined OpCode and defining a new OAM PDU based thereon. That is, the method 300 may utilize the ETH-MCC PDU 400, or another new OAM PDU defined based on a vendor-specific, reserved, and/or undefined OpCode.

The ETH-MCC PDU 400 includes a MEG Level (MEL) which is a 3-bit field containing an integer value (0 to 7) that identifies the MEG Level of the ETH-MCC PDU 400. A Version field is a 5-bit field containing an integer value that identifies the OAM protocol version. An OpCode is a 1-octet field containing an OpCode that identifies an OAM PDU type, and in the case of the ETH-MCC PDU 400 is set to 41. The OpCode is used to identify the remaining content of an OAM PDU. A Flag field is an 8-bit field dependent on the OAM PDU type, and in the case of the ETH-MCC PDU 400 is set to all zeros. TLV Offset is a 1-octet field containing the offset to the first TLV in an OAM PDU relative to the TLV Offset field. The value of this field is associated with an OAM PDU type. When the TLV Offset is 0, it points to the first octet following the TLV Offset field. An Organizationally Unique Identifier (OUI) is used to identify the organization defining a specific format and meaning of the ETH-MCC PDU 400. SubOpCode is a 1-octet field that is used to interpret the remaining fields in the ETH-MCC PDU 400. Depending on the functionality indicated by the OUI and organizationally specific SubOpCode, MCC may carry one or more TLVs. In an exemplary embodiment, the notifications associated with the method 300 may be included in the MCC data. Finally, End TLV is an all-zeros octet value at the end of the ETH-MCC PDU 400.

Figure 4B:
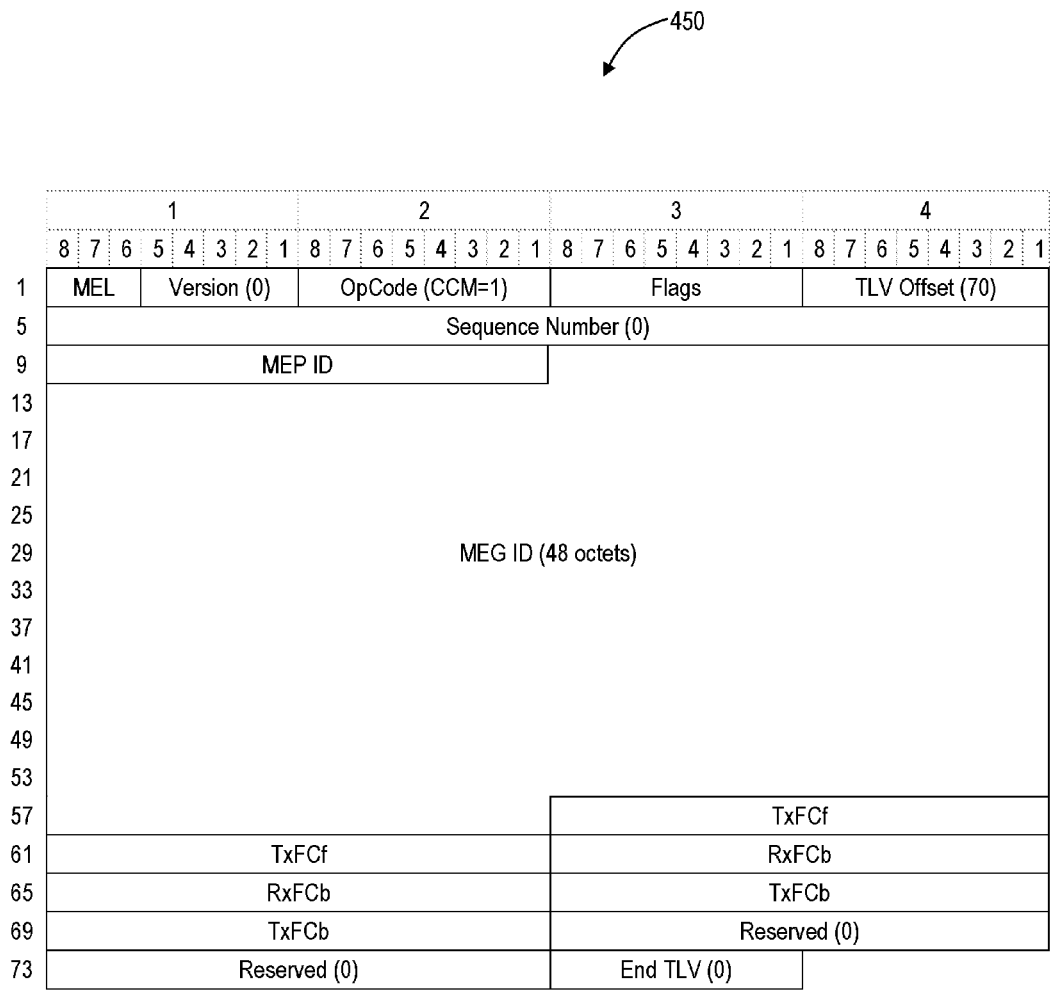

Referring to FIG. 4B, in an exemplary embodiment, a block diagram illustrates an exemplary CCM PDU 450 for use in the network 100, with the network element 200, the method 300, and the like. As described herein, the CCM PDU 450 is multicast from MEPs to all MIPs and MEPs associated with a given MA/MEG. In an exemplary embodiment, the CCM PDU 450 is a G.8013/Y.1731 Ethernet Continuity Check (ETH-CC) PDU. Generally, CCMs refer to the overall PDU whereas the ETH-CC represents the information contained therein. The ETH-CC function is used for proactive OAM such as to detect loss of continuity (LOC) between any pair of MEPs in a MEG, unintended connectivity between two MEGs (Mismerge), unintended connectivity within the MEG with an unexpected MEP (Unexpected MEP), and other defect conditions (e.g. Unexpected MEG Level, Unexpected Period, etc.). Thus, the CCM is applicable for fault management, performance monitoring, or protection switching applications. In operation, upon reception, a MEP reports a frame with unexpected ETH-CC information. As described herein, CCM transmission may be enabled or disabled in a MEG/MA. When CCM transmission is enabled in a MEG/MA, all MEPs are enabled to periodically transmit frames with ETH-CC information to all other MEPs in the MEG/MA. The CCM transmission period may be the same for all MEPs in the MEG/MA. When a MEP is enabled to generate frames with ETH-CC information, it also expects to receive frames with ETH-CC information from its peer MEPs in the MEG/MA.

The CCM PDU 450 may include a MEG Level (MEL) which is a 3-bit field containing an integer value (0 to 7) that identifies the MEG Level of the CCM PDU 450. A Version field is a 5-bit field containing an integer value that identifies the OAM protocol version. An OpCode is a 1-octet field containing an OpCode that identifies an OAM PDU type, and in the case of the CCM PDU 450 is set to 1. The OpCode is used to identify the remaining content of an OAM PDU. A Flag field is an 8-bit field dependent on the OAM PDU type, and in the case of the CCM PDU 450 contains two information elements for Remote Defect Indication (RDI) and Period. A first bit of the Flag field (bit 8) is a single bit for RDI, which is set to 1 to indicate a remote defect and otherwise is set to 0. The last three bits of the Flag field (bits 3 to 1) indicate a transmission period for the CCM PDU 450 as illustrated in the following table:

| Flags [3:1] | Period Value | Comments |
| --- | --- | --- |
| 000 | Invalid Value | Invalid value for CCM PDUs |
| 001 | 3.33 ms | 300 frames per second |
| 010 | 10 ms | 100 frames per second |
| 011 | 100 ms | 10 frames per second |
| 100 | 1 s | 1 frame per second |
| 101 | 10 s | 6 frames per minute |
| 110 | 1 min | 1 frame per minute |
| 111 | 10 min | 6 frame per hour |

In an exemplary embodiment, the transmission period is a dynamically modifiable attribute in the Carrier Ethernet systems and methods described herein. For example, the Period value may be modified responsive to criticalness of a service (or lack thereof), network congestion, network operations (e.g. maintenance, software upgrades, etc.), and the like. In general, values for the Period are recommended based on an application area. For example, there may be many different applications (for each application, a default transmission period is specified) such as Fault Management (default transmission period is is (i.e. transmission rate of 1 frame/second)), Performance Monitoring (default transmission period is 100 ms (i.e. transmission rate of 10 frames/second)), and Protection Switching (default transmission period is 3.33 ms (i.e. transmission rate of 300 frames/second)).

TLV Offset is a 1-octet field containing the offset to the first TLV in an OAM PDU relative to the TLV Offset field. The value of this field is associated with an OAM PDU type, and in the case of the CCM PDU 450 is set to 70. Sequence Number is a 4-octet field that contains the transaction ID/sequence number, and in the case of the CCM PDU 450 is set to all zeros. MEP ID is a 13-bit integer value identifying the transmitting MEP within the MEG. The three most significant bits (MSBs) of the first octet are not used and set to zero. A MEG ID is a 48-octet field. Refer to Annex A for the format used for the MEG ID field. The features of the MEG ID are each MEG ID must be globally unique; where it may be expected that the MEG may be required for path set-up across an inter-operator boundary, the MEG ID must be available to other network operators; the MEG ID should not change while the MEG remains in existence; and the MEG ID should be able to identify the network operator which is responsible for the MEG. TxFCf is a 4-octet field which carries the value of the counter of in-profile data frames transmitted by the MEP towards its peer MEP, at the time of CCM frame transmission. RxFCb is a 4-octet field which carries the value of the counter of in-profile data frames received by the MEP from its peer MEP, at the time of receiving the last CCM frame from that peer MEP. TxFCb is a 4-octet field which carries the value of the TxFCf field in the last CCM frame received by the MEP from its peer MEP. Finally, two reserved fields and an End TLV field are all set to all zeros in the CCM PDU 450.

Upon reception by a MEP of the CCM PDU 450, the MEP examines it to ensure that its MEG ID matches the configured MEG ID in the receiving MEP and that the MEP ID in the CCM frame is one from the configured list of peer MEP IDs. The information in the CCM frame is cataloged in the receiving MEP. The CCM PDU 450 allows detection of different defect conditions. Exemplary defect conditions may include if no CCM frames from a peer MEP are received within the interval equal to 3.5 times the receiving MEP's CCM transmission period, loss of continuity with peer MEP is detected; if a CCM frame with a MEG Level lower than the receiving MEP's MEG Level is received, Unexpected MEG Level is detected; if a CCM frame with same MEG Level but with a MEG ID different than the receiving MEP's own MEG ID is received, Mismerge is detected; if a CCM frame with the same MEG Level and a correct MEG ID but with an incorrect MEP ID, including receiving MEP's own MEP ID, is received, Unexpected MEP is detected; if a CCM frame is received with a correct MEG Level, a correct MEG ID, a correct MEP ID, but with a period field value different than the receiving MEP's own CCM transmission period, Unexpected Period is detected. The receiving MEP may notify fault management process when it detects the above defect conditions. In another exemplary embodiment, the interval, MEG Level, etc. in the foregoing may be dynamically modifiable attributes in the Carrier Ethernet systems and methods described herein.

Figure 5:
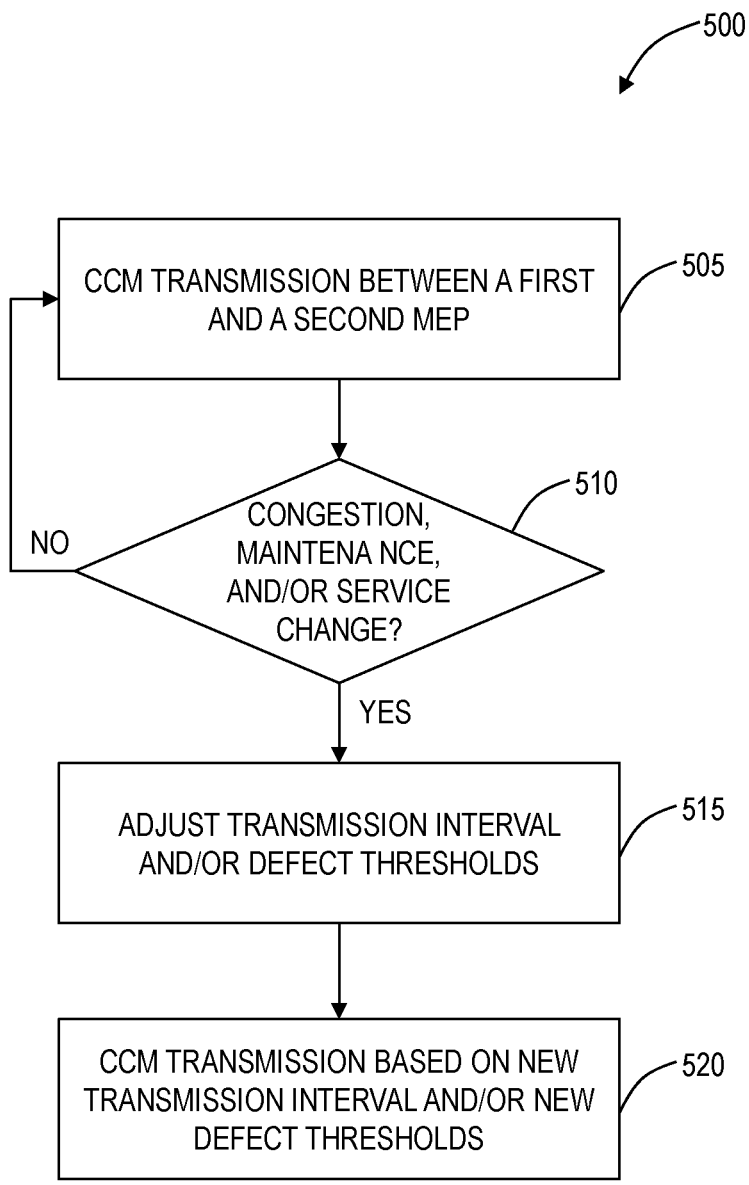
FIG. 5 is a flowchart of a Continuity Check Message (CCM) attribute adjustment method between two MEPs.

Referring to FIG. 5, in an exemplary embodiment, a flowchart illustrates a CCM attribute adjustment method 500 between two MEPs. As described herein, the method 500 may be utilized with respect to the network 100, the network element 200, and/or with the method 300. In general, the method 500 provides a mechanism for MEPs to dynamically adjust their attributes therebetween without requiring static reconfiguration. Initially, a first MEP and a second MEP are transmitting CCMs therebetween (step 505). The CCMs are transmitted with a first set of attributes associated with the CCMs and the MEPs, such as transmission interval, threshold conditions for various defects, and the like. The adjustment method 500 is configured to perform some adjustment to the first set of attributes based on a plurality of conditions, such as congestion, maintenance, service change, etc. (step 510). Furthermore, the adjustments may be manually requested (e.g., through a NMS/EMS based on user input), periodic, and/or automatic based on predetermined conditions. In an exemplary embodiment, the adjustment method 500 may be implemented based on congestion, i.e. network traffic volume is high such that it may be required to increase CCM transmission interval and/or increase defect thresholds. In another exemplary embodiment, the adjustment method 500 may be implemented based on maintenance, i.e. software upgrades, link upgrades, etc. such that it may be required to increase CCM transmission interval and/or increase defect thresholds. In yet another exemplary embodiment, the adjustment method 500 may be implemented based on service changes, i.e. increase or decrease in priority of a service such that it may be required to increase or decrease CCM transmission interval and/or increase or decrease defect thresholds.

The adjustment method 500 performs an adjustment to the CCM transmission interval and/or defect thresholds (step 515). The adjustment method 500 may utilize the method 300 for automatically performing the adjustments without requiring static reconfiguration. Responsive to the adjustment, CCM transmission is performed between the first MEP and the second MEP based on the new transmission interval and/or the new defect thresholds. Advantageously, the adjustment method 500 allows for a more scalable solution by monitoring more critical services at a higher frequency and less critical services at lower frequency thereby reducing the consumption of resources. When the criticality of a service changes dynamically, the service could automatically be monitored at a higher frequency and vice versa. Specifically, monitoring all the services, e.g. Active and Standby, at a higher frequency requires more resources compared to just monitoring the Active services at a higher frequency and the Standby Services at a lower frequency. By changing the monitoring interval dynamically, the same benefits of rapid fault detection are achieved for all services but with fewer resources utilized.

Figure 6:
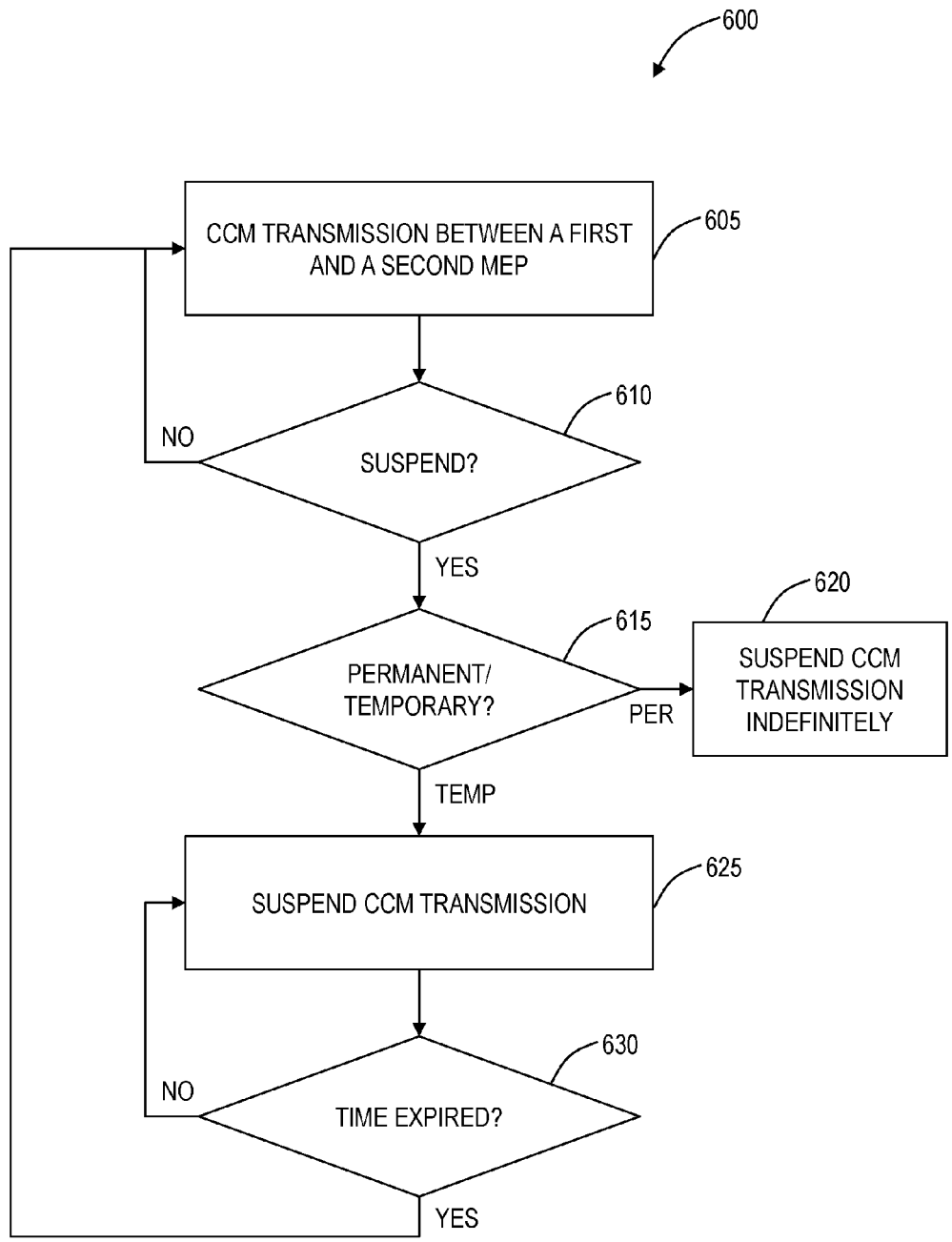
FIG. 6 is a flowchart of a CCM suspension method between two MEPs.

Referring to FIG. 6, in an exemplary embodiment, a flowchart illustrates a CCM suspension method 600 between two MEPs. As described herein, the method 600 may be utilized with respect to the network 100, the network element 200, and/or with the method 300. In general, the method 600 provides a mechanism for MEPs to suspend and/or resume CCM transmission therebetween without requiring static reconfiguration. Initially, a first MEP and a second MEP are transmitting CCMs therebetween (step 605). The suspension method 600 is implemented to suspend the transmission of CCMs (step 610). The suspension may be permanent or temporary (step 615). If the suspension is permanent, the suspension method 600 suspends CCM transmission indefinitely between the two MEPs (step 620). For example, the MEPs may utilize the notifications in the method 300 for performing the suspension. If the suspension is temporary, the suspension method 600 suspends CCM transmission for a set period (step 625). Again, the MEPs may utilize the notifications in the method 300 for performing the suspension. The set period may include a defined time limit. Upon expiration of the time limit (step 630), the two MEPs may again resume CCM transmission therebetween (step 605). In an exemplary embodiment, the suspension method 600 may be utilized to stop/resume CCM transmissions based on maintenance, congestion, etc.

Figure 7:
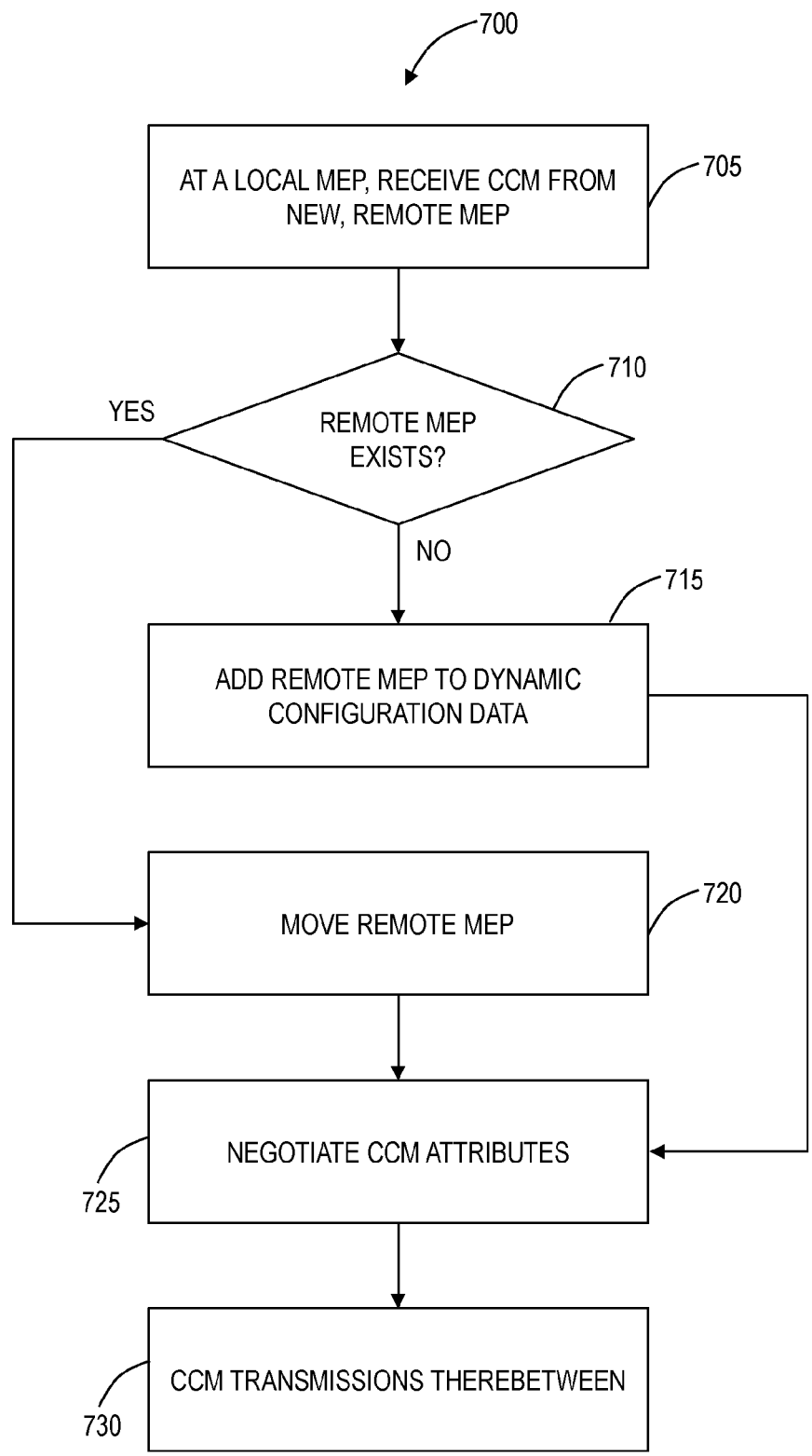
FIG. 7 is a flowchart of a MEP auto-discovery and leaving method.

Referring to FIG. 7, in an exemplary embodiment, a flowchart illustrates a MEP auto-discovery and leaving method 700. As described herein, the method 700 may be utilized with respect to the network 100, the network element 200, and/or with the method 300. In general, the method 700 provides mechanisms for a receiving MEP to auto-discover and/or reconfigure a new remote MEP based on reception of a CCM from said new, remote MEP (step 705). If the remote MEP does not exist at the receiving MEP (i.e., in a system database or any local databases on the line cards associated with the receiving MEP), the method 700 adds the remote MEP dynamically to configuration data associated with the receiving MEP (step 715). If the remote MEP does exist at the receiving MEP, the method 700 is configured to move the remote MEP between processors at the receiving MEP (step 720). As defined, the move may include an update to a system database where the remote MEP is changed on particular ports.

For example, when one processor discovers a new remote MEP while a centralized dynamic configuration has the new remote MEP in another processor, the method 700 may move all the remove MEP attributes and state machine from one processor to another. Specifically, in a distributed CFM implementation, a new remote MEP to a processing entity (e.g., the network element 200) is exposed and known to various components included therein (e.g., the line blades 202, the control modules 204, etc.). That is, when a remote MEP is provisioned and/or discovered, the control module 204 may provide an internal notification to all line blades 202. Following either step 715 or 720, the method 700 may negotiate CCM attributes (such as using the methods 300, 500, 600) or may use default settings (step 725). Finally, the receiving MEP and the remote MEP provide CCM transmissions therebetween (step 730). In addition to the foregoing, the remote MEP may also utilize the method 300, 700 to notify its peer MEPs that it is leaving a MEG/MA. Note, the MEPs may also perform attribute negotiation (such as using the methods 300, 500, 600) subsequent to the method 700, i.e. following remote MEP discovery.

In an exemplary embodiment, the CCM from the new, remote MEP (step 705) may be in a system database associated with the local MEP (e.g., the database 220 in the control module 204). Each line blade 202 of the local MEP may include a local copy of the system database, but only one of the line blades 202 may be active with respect to the remote MEP. So if a non-active line blade 202 receives a CCM from the remote MEP, the method 700 may be utilized to dynamically set up the remote MEP based on receiving the CCM, i.e. the receiving line blade 202 is set to active, and the original line blade 202 with the remote MEP is set to non-active.

In another exemplary embodiment, the method 700 may be utilized to create MEPs in other MEGs/MAs. For example, a notification could include information such VLAN, interface, MD-level, MEGID, etc., that the receiving MEP could use to create a new local MEP in another MEG/MA. In other words, this may be referred to as local MEP discovery. An exemplary application may include a "control MEG/MA" to be used for signaling the provisioning CFM in service or data MEGs/MAs.

Of note, various exemplary embodiments have been described herein with reference to Ethernet and more particularly Carrier Ethernet. Those of ordinary skill in the art will recognize the systems and methods described herein are contemplated with other protocols, technologies, network layers, and the like. That is, the dynamic adjustment and discovery methods described herein may apply to other statically configured protocols. For example, Multiprotocol Label Switching (MPLS) and variants thereof such as MPLS-Transport Profile (TP) include statically configured Fault and Performance Management architectures. The various systems and methods described herein are contemplated for use with MPLS and variants thereof for dynamically adjusting and/or modifying the Fault Management (FM) and Performance Management (PM) therein without requiring static reconfigurations.

MPLS-TP is a profile of MPLS for transport networks taking a subset of the MPLS/GMPLS protocol suite and adding extensions to address transport network requirements. For example, OAM is a key focus area for MPLS-TP and includes fault detection (through continuity checks, connectivity/path verification, etc.), fault localization, and performance monitoring. For example, ITU has defined MPLS-TP OAM in ITU-T G.8113.1 (05/11) "Operations, Administration and Maintenance mechanism for MPLS-TP in Packet Transport Network (PTN)" and G.8113.2/Y.1372.2 (09/11) "Operations, Administration and Maintenance mechanisms for MPLS-TP networks using the tools defined for MPLS," the contents of each are herein incorporated by reference. Here, MPLS-TP also utilizes Continuity Check Messages similarly to as defined in CFM. Furthermore, MPLS-TP also utilizes MEPs, MIPs, MEGs, ETH-MCC PDUs, and the like. Accordingly, the systems and methods described herein may be utilized with MPLS-TP for dynamic notifications and actions taken based thereon between MEPs. The systems and methods may also include a CCM attribute adjustment method between two MEPs in MPLS-TP, a CCM suspension and/or resumption method between two MEPs in MPLS-TP, and a MEP auto-discovery and/or leaving method in MPLS-TP. Advantageously, the systems and methods may be utilized in a variety of contexts in MPLS-TP including controlled maintenance, in-service software upgrades, network congestion, the discovery of new remote MEPs, and the like to enable dynamic configurations between MEPs.

In an exemplary embodiment, MPLS/MPLS-TP includes Bidirectional Forwarding Detection (BFD) functionality described in RFC 5880 (06/10) "Bidirectional Forwarding Detection (BFD)," the contents of which are herein incorporated by reference. Of note, BFD has similar functionality as CCMs do in Ethernet. For example, in BFD, a pair of network elements transmit BFD packets periodically over each path between the two network elements, and if a network element stops receiving BFD packets for long enough, some component in that particular bidirectional path to the neighboring system is assumed to have failed. Conventionally, BFD does not support remote MEP discovery part, i.e. remote MEPs must be statically configured in conventional systems and methods. Thus, in an exemplary embodiment, the methods 300, 700 may be applied to MPLS/MPLS-TP for remote MEP discovery, configuration, etc. thereby avoiding static configurations thereof. Additionally, the BFD protocol does have some built-in adjustable transmission and reception intervals. In an exemplary embodiment, the methods 300, 500, 600 may be utilized for dynamic attribute adjustment in BFD consistent with the attributes contained therein.

In an exemplary embodiment, the systems and methods described herein relate generally to dynamic adjustment of OAM attributes between network elements without requiring static reconfigurations therebetween. The OAM attributes may include CFM attributes, Performance Management attributes, Fault Management attributes, BFD attributes, and the like. For example, the OAM attributes may be related to any of fault, configuration, accounting, performance, security (FCAPS) attributes.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like. In particular, the MEPs 102, 104 and/or the network element 200 may include some or all of the aforementioned components for implementation of the Carrier Ethernet systems and methods described herein.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method implemented by a network element for performing dynamic Operations, Administration, and Maintenance (OAM), the method comprising:
communicating Connectivity Fault Management (CFM) frames with a second network element, wherein the communicating is based on a set of attributes that include Continuity Check Messages (CCMs) attributes and Maintenance Entity Group attributes;
modifying one or more attributes of the set of attributes through adjusting a configuration of the CCM attributes or the Maintenance Entity Group attributes at the network element for the OAM with the second network element based on data inserted in a CFM frame by the second network element in one of a vendor specific Operational Code (OpCode) Protocol Data Unit (PDU) and an organization specific Type, length, and value (TLV); and
communicating the CFM frames with the second network element based on the set of attributes and the adjusted one or more attributes subsequent to the modifying.

2. The method of claim 1, wherein the one or more attributes comprise a transmission interval of Continuity Check Messages (CCMs) and the modifying comprises changing from a first value to a second value.

3. The method of claim 1, wherein the one or more attributes comprise a threshold count associated with Continuity Check Messages (CCMs) for determining a defect condition and the modifying comprises changing from a first value to a second value.

4. The method of claim 1, wherein the one or more attributes comprise a one of suspension and resumption of transmission of Continuity Check Messages (CCMs) and the modifying comprises changing between the suspension and the resumption.

5. The method of claim 4, wherein the suspension is for a specific time period, based on one of maintenance and congestion.

6. The method of claim 1, wherein the one or more attributes comprise configuration of a Maintenance Entity Group and the modifying comprises adjusting which network elements are in the Maintenance Entity Group.

7. The method of claim 1, wherein the one or more attributes are modified without traffic loss or loss of OAM between the network element and the second network element.

8. The method of claim 1, wherein the modifying is performed based one of network congestion, a maintenance event, and a service change to avoid loss of OAM between the network element and the second network element based thereon.

9. A network element configured to perform dynamic Operations, Administration, and Maintenance (OAM), the network element comprising:
a port configured to communicate Connectivity Fault Management (CFM) frames with a second network element, wherein the communication is based on a set of attributes that include Continuity Check Messages (CCMs) attributes and Maintenance Entity Group attributes; and
a controller configured to modify one or more attributes of the set of attributes through adjustment of a configuration of the CCM attributes or the Maintenance Entity Group attributes at the network element for the OAM with the second network element based on data inserted in a CFM frame by the second network element in one of a vendor specific Operational Code (OpCode) Protocol Data Unit (PDU) and an organization specific Type, length, and value (TLV), wherein the port is configured to communicate the CFM frames with the second network element based on the set of attributes and the adjusted one or more attributes subsequent to the modification.

10. The network element of claim 9, wherein the one or more attributes comprise a transmission interval of Continuity Check Messages (CCMs) and the modifying comprises changing from a first value to a second value.

11. The network element of claim 9, wherein the one or more attributes comprise a threshold count associated with Continuity Check Messages (CCMs) for determining a defect condition and the modifying comprises changing from a first value to a second value.

12. The network element of claim 9, wherein the one or more attributes comprise a one of suspension and resumption of transmission of Continuity Check Messages (CCMs) and the modifying comprises changing between the suspension and the resumption.

13. The network element of claim 12, wherein the suspension is for a specific time period, based on one of maintenance and congestion.

14. The network element of claim 9, wherein the one or more attributes comprise configuration of a Maintenance Entity Group and the modifying comprises adjusting which network elements are in the Maintenance Entity Group.

15. The network element of claim 9, wherein the one or more attributes are modified without traffic loss or loss of OAM between the network element and the second network element.

16. The network element of claim 9, wherein the modifying is performed based one of network congestion, a maintenance event, and a service change to avoid loss of OAM between the network element and the second network element based thereon.

17. A Maintenance Entity Group, comprising:
a first network element configured as a first Maintenance End Point (MEP); and
a second network element configured as a second MEP communicatively coupled to the first MEP;
wherein Connectivity Fault Management (CFM) frames are communicated between the first MEP and the second MEP based on a set of attributes that include Continuity Check Messages (CCMs) attributes and Maintenance Entity Group attributes,
wherein the first MEP is configured to modify one or more attributes of the set of attributes through adjustment of a configuration of the CCM attributes or the Maintenance Entity Group attributes at the first MEP for the OAM with the second MEP based on data inserted in a CFM frame the second MEP in one of a vendor specific Operational Code (OpCode) Protocol Data Unit (PDU) and an organization specific Type, length, and value (TLV), and the CFM frames are communicated based on the set of attributes and the adjusted one or more attributes subsequent to the modification.

18. The Maintenance Entity Group of claim 17, wherein the one or more attributes comprise at least one of
i) a transmission interval of Continuity Check Messages (CCMs) and the modification comprises changing from a first value to a second value, ii) threshold count associated with Continuity Check Messages (CCMs) for determining a defect condition and the modification comprises changing from a first value to a second value,
iii) a one of suspension and resumption of transmission of Continuity Check Messages (CCMs) and the modification comprises changing between the suspension and the resumption, and
iv) configuration of a Maintenance Entity Group and the modification comprises adjusting which network elements are in the Maintenance Entity Group.

\* \* \* \* \*